Nov. 30, 1948.  W. E. AMBERG  2,454,906
PAPER CUP AND HANDLE THEREFOR
Filed Nov. 19, 1945
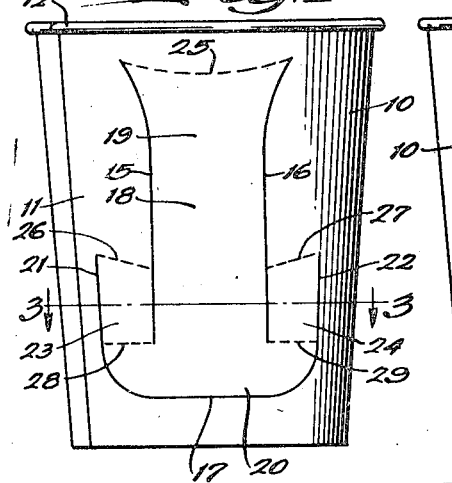
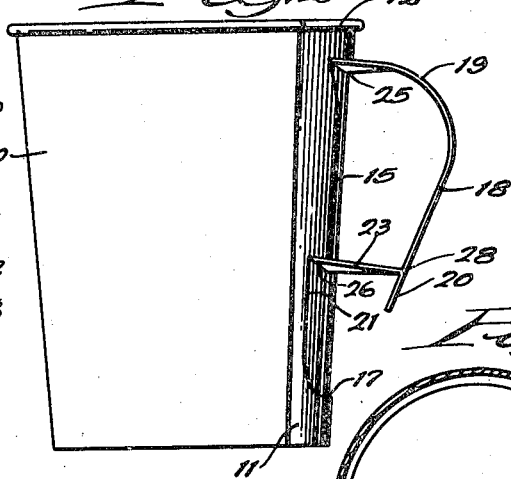
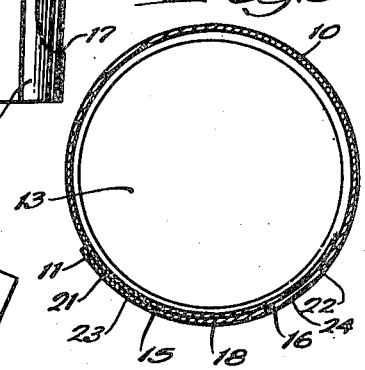
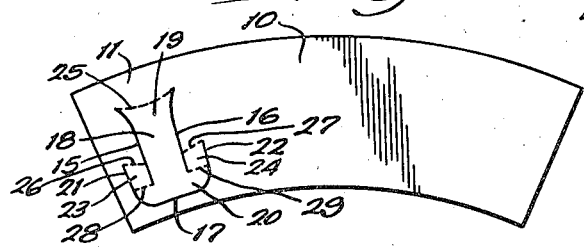
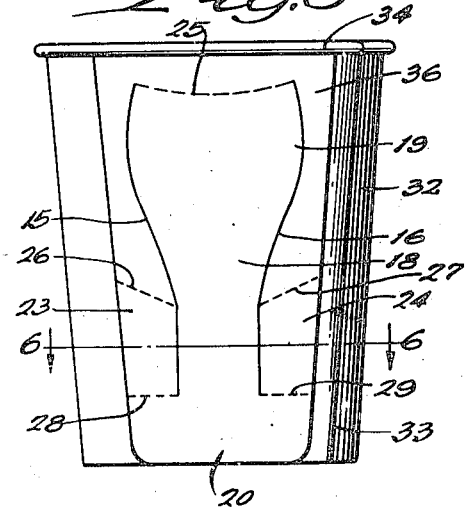
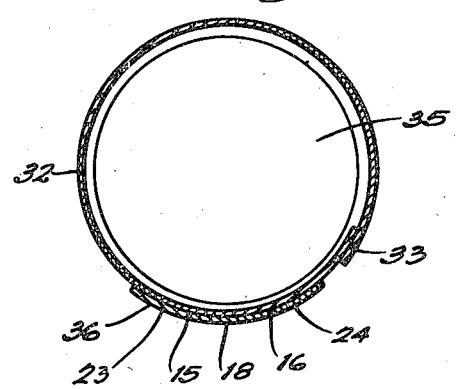
Inventor:
Walter E. Amberg,
By Dawson, Booth my Spengarberg.
Attorneys.

Patented Nov. 30, 1948

2,454,906

UNITED STATES PATENT OFFICE 2,454,906

PAPER CUP AND HANDLE THEREFOR

Walter E. Amberg, Beverly Shores, Ind., assignor, by mesne assignments, to Lily-Tulip Cup Corporation, New York, N. Y., a corporation of Delaware Application November 19, 1945, Serial No. 629,447

5 Claims. (Cl. 229—52)

This invention relates to improvements in paper cups and more particularly to paper cups for holding hot liquids such as hot coffee and the like.

When paper cups are utilized for holding hot liquids the outside of the cup also becomes hot by reason of transfer of heat through the walls of the cup much to the discomfort of the person holding the hot paper cup. In the past paper cups have been provided with paper handles whereby discomfort of the person holding the hot paper cup has been considerably decreased. However, such paper handles have been rather flimsy in construction and when grasped the paper cup has a tendency to shift and wobble with respect to the handle and to swivel downwardly if the handle is not tightly grasped which often results in spilling the hot contents of the cup. This, of course, is also discomforting to the person holding the hot paper cup.

The principal object of this invention is to provide an improved handle for paper cups which may be readily folded into place and which is of firm construction and which does not permit shifting and wobbling and swiveling of the cup with consequent spilling of the hot contents thereof.

In carrying out this object of the invention the side wall of the paper cup is provided with a collapsible handle having a vertically arranged handle portion hinged at its top to the side wall and a vertically arranged arm portion hinged at its top to the side wall below the hinge point of the handle portion and also hinged at its bottom to the handle portion. The handle is adapted to lie close to the side wall of the cup to permit nesting of a plurality of cups and the handle is adapted to be folded upwardly from the side wall by folding at said hinge points and bending of the handle portion. Three substantially horizontal hinges are therefore utilized, two on the side wall for the handle portion and the arm portion and the other between the handle portion and the arm portion.

These three horizontal hinges prevent sidewise shifting or wobbling of the cup with respect to the handle thereby providing a firm and rigid construction. This handle construction provides a stirrup through which the forefinger may be inserted so that the handle portion may be firmly grasped between the forefinger and the thumb and at the same time the handle may rest on the second finger for steadying the cup.

The handle may be readily formed from a separate piece of paper adhesively secured to the side wall of the cup or from a flap integral with the side wall of the cup and adhesively secured thereto. To assist in the folding of the handle the upper hinge of the handle portion is preferably made along an arcuate line and the upper hinge for the arm portion is preferably made along angularly disposed lines, this being done to compensate for the curvature of the side wall of the cup.

Further objects of this invention reside in the details of construction of the improved paper cup and handle therefor.

Other objects and advantages will become apparent to those skilled in the art upon reference to the accompanying specification, claims, and drawing, in which:

Fig. 1 is a side elevational view of one form of the cup showing the handle collapsed and lying close to the side wall of the cup;

Fig. 2 is a side elevational view looking from the left in Fig. 1 but with the handle folded upwardly;

Fig. 3 is a sectional view taken substantially on the line 3—3 of Fig. 1;

Fig. 4 is a plan view of the blank forming the side wall of the cup of Fig. 1;

Fig. 5 is a side elevational view similar to Fig. 1 showing a modified form of the cup; and Fig. 6 is a sectional view taken on the line 6—6 of Fig. 5.

Referring now to Figs. 1 to 4, the side wall of the cup is designated at 10 and it includes a sealing flap 11. The upper edge of the side wall 10 of the cup may be rolled into the usual flange and the lower edge of the side wall 10 may be suitably secured to or formed with the bottom 12.

The sealing flap 11 is provided with a pair of substantially vertically arranged slits 15 and 16 and a substantially horizontally arranged slit 17 to form an inverted generally T-shaped handle portion 18 having a leg 19 and a cross 20. The sealing flap 11 is also provided with substantially vertically arranged slits 21 and 22 to provide arm portions 23 and 24.

The leg of the handle portion is hinged to the sealing flap 11 along the fold line 25. The arm portions 23 and 24 are hinged to the sealing flap 11 along the fold lines 26 and 27, these fold lines being located below the fold line 25 of the handle portion 19. The arm portions 23 and 24 are hinged to the cross 20 of the handle portion 18 along fold lines 28 and 29.

As shown in Figs. 1 and 3, the handle is adapted to lie close to the side wall 10 of the cup to permit nesting of a plurality of cups. The sealing flap is adhesively secured to the side wall of the cup to form a liquid-tight container. However, adhesive material is not applied to the sealing flap 11 within the confines of the handle so that the handle may be folded upwardly from the side wall 10 by folding at the hinge points 25, 26, 27, 28 and 29 and bending of the handle portion 18. When the handle is folded into position it assumes the position shown in Fig. 2. Three substantially horizontal hinges are therefore utilized, two on the side wall for the handle portion and the arm portion, and the other between the handle portion and the arm portion. These three horizontally arranged hinges prevent sidewise shifting or wobbling of the cup with respect to the handle, thereby providing a firm and rigid construction. As shown in Fig. 2, the handle construction provides a stirrup through which the forefinger may be inserted so that the handle portion may be firmly grasped between the forefinger and the thumb and at the same time the handle portion may rest on the second finger for steadying the cup.

It will be noted that the hinge formed by the fold line 25 is made along an arcuate line and that the upper hinges 26 and 27 for the arm portions 23 and 24 are made along angularly disposed fold lines. This is done to compensate for the curvature of the side wall 10 of the cup.

Figs. 5 and 6 illustrate a modified form of the cup wherein the handle is formed from a separate piece of paper adhesively secured to the side wall of a conventional cup. Here the cup is shown to comprise a side wall 32 having the usual seam 33. The top edge of the side wall 32 may be rolled into a flange 34 and the bottom edge may be suitably secured to or formed with a bottom wall 35. The handle is formed from a piece of paper 36 adhesively secured to the side wall 32 of the cup.

The piece of paper 36 has substantially vertically arranged slits 15 and 16 forming a generally inverted T-shaped handle portion 18 having a leg 19 and a cross 20. The handle portion 18 is adapted to be folded upwardly along the fold line 25. Arm portions 23 and 24 are hinged to the piece of paper 36 and hence the side wall 32 of the cup along hinge lines 26 and 27 and are hinged to the handle portion 18 along hinge lines 28 and 29. In these respects, therefore, the handle of the cup of Fig. 5 is substantially the same as the handle of the cup of Fig. 1, and, therefore, a further description thereof is not considered necessary.

When the piece of paper 36 is adhesively secured to the side wall 32 of the cup, adhesive material is not applied to the handle portion 18 or the leg portions 23 and 24 so that the handle portion and the leg portions may be folded upwardly away from the side wall of the cup to form the handle.

While for purposes of illustration two forms of this invention have been disclosed, other forms thereof may become apparent to those skilled in the art upon reference to this disclosure and therefore this invention is to be limited only by the scope of the appended claims and prior art.

I claim as my invention:

1. A paper cup comprising a side wall, a collapsible handle thereon including a vertically arranged handle portion hinged at its top to the side wall, and a pair of vertically arranged arm portions on each side of the handle portion hinged at their tops to the side wall below the hinge point of the handle portion and hinged at their bottoms to the handle portion, said handle adapted to lie close to the side wall of the cup to permit nesting of a plurality of cups, and said handle adapted to be folded upwardly from the side wall by folding at said hinge points and bending of the handle portion.

2. A paper cup comprising a side wall, a collapsible handle thereon including a vertically arranged inverted T-shaped handle portion hinged at its top to the side wall, and a pair of vertically arranged arm portions on each side of the leg of the T-shaped handle portion hinged at their tops to the side wall below the hinge point of the handle portion and hinged at their bottoms to the cross of the T-shaped handle portion, said handle adapted to lie close to the side wall of the cup to permit nesting of a plurality of cups, and said handle adapted to be folded upwardly from the side wall by folding at said hinge points and bending of the handle portion.

3. A paper cup comprising a side wall, a paper blank slitted to provide a vertically arranged handle portion hinged at its top to the blank, and a pair of vertically arranged arm portions hinged at their top to the blank below the hinge point of the handle portion and hinged at their bottom to the handle portion, said paper blank being adhesively secured to the side wall so as to permit the handle portion and arm portions to be folded upwardly from the side wall by folding at said hinge points and bending of the handle portion and to permit the handle portion and arm portions to lie close to the side wall for nesting a plurality of cups.

4. A paper cup comprising, a side wall having a flap slitted to provide a vertically arranged handle portion hinged at its top to the flap and a pair of vertically arranged arm portions hinged at their top to the flap below the hinge point of the handle portion and hinged at their bottom to the handle portion, said flap being adhesively secured to the side wall so as to permit the handle portion and arm portions to be folded upwardly from the side wall by folding at said hinge points and bending of the handle portion and to permit the handle portion and arm portions to lie close to the side wall for nesting a plurality of cups.

5. A paper cup comprising, a side wall, a collapsible handle thereon including a vertically arranged handle portion hinged along an arcuate line at its top to the side wall, and a pair of vertically arranged arm portions on each side of the handle portion hinged along angularly disposed lines at their tops to the side wall below the hinge point of the handle portion and hinged along straight lines at their bottoms to the handle portion, said handle adapted to lie close to the side wall of the cup to permit nesting of a plurality of cups, and said handle adapted to be folded upwardly from the side wall by folding at said hinge points and bending of the handle portion.

WALTER E. AMBERG.

REFERENCES CITED

The following references are of record in the file of this patent:

UNITED STATES PATENTS

| Number | Name | Date |
| --- | --- | --- |
| 1,627,042 | Mason et al. | May 3, 1927 |